Dec. 4, 1951 M. L. EASTON 2,577,185
SALAD MIXING AND SERVING BOWL
Filed Nov. 15, 1950
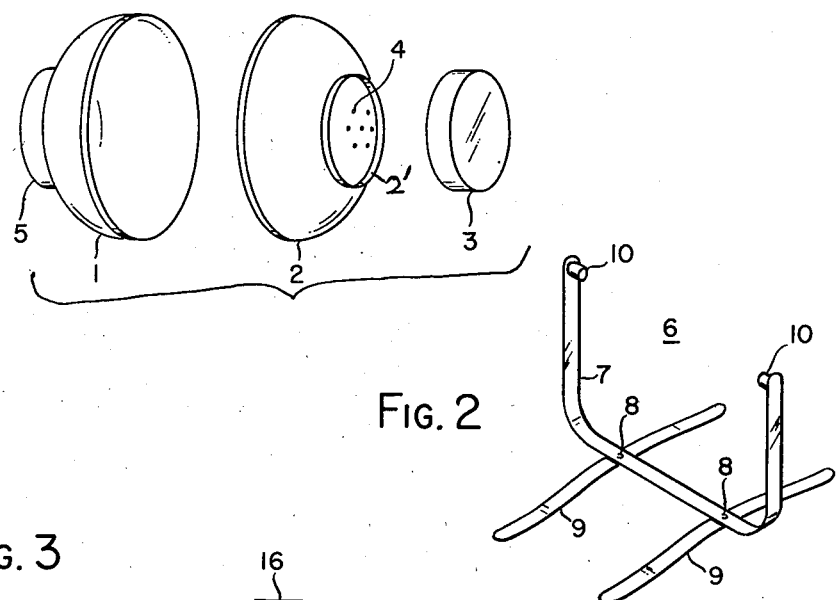
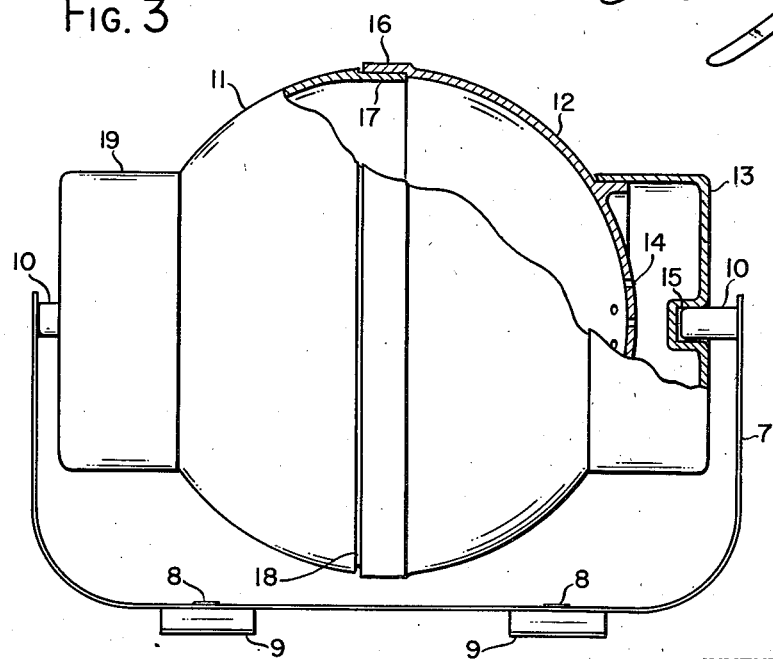
INVENTOR
Margaret Leona Easton Patented Dec. 4, 1951

2,577,185

UNITED STATES PATENT OFFICE 2,577,185

SALAD MIXING AND SERVING BOWL

Margaret Leona Easton, Baltimore, Md.

Application November 15, 1950, Serial No. 195,871

1 Claim. (Cl. 259—30)

Referring to the drawing:

Fig. 1 is an exploded view of an individual service size bowl;

Fig. 2 is a view of a stand to support a family size bowl; and

Fig. 3 shows a view of a family size bowl supported on the stand.

The parts are made of a durable transparent plastic or other suitable material and have many practical uses; among which, the saving of time, energy and materials are hereby mentioned. Although the principle of design and action is the same in each instance, a stand, shown as Figure 2 on the drawing, is required for the family or large commercial size.

Figure 1 illustrates half-bowl sections when opened. The sections are fitted together in a pressed rim-over-lip fashion. The section 1 has a fixed base 5 and is identical in shape to the section 2; but the section 2 has a cup-base 3, which is removably placed on a rim 2' which surrounds holes 4 in the base 2. These holes act as a drain or outlet for excess liquids. When the bowl is closed, with all parts in place, with the ingredients, such as solids and liquids therein ready for mixing, it is manually operated as an agitator, thus enabling the mixture to become well blended in a minimum amount of time and with little effort. When the mixing is completed, the bowl is placed vertically on the removable cup-base until all excess liquids have drained into the cup-base 3. The halves are then divided for individual servings. Before, or after the salad is eaten, the dressing-liquid contained in the cup-base may be emptied into another container and placed in the refrigerator for future use. This is an economical feature.

In Figure 2, the stand design as illustrated may be manufactured of any suitable metal or material having the qualities necessary to provide a spring-clip 7. The clip holds the pivot-points 10, in proper position for reception in pits 15. Bolts and wing-nut fasteners 8, are used to attach the stand legs 9 to the spring clip 7.

Figure 3 shows the family-size bowl in place on the stand 6, in which ingredients are thoroughly blended. After which, the family-size bowl is removed from the stand 6, and placed on its removable cup-base 13, to allow for drainage. The sections 11 and 12 are each large family-size half bowls. The section 12 has holes 14 therein. Pits 15 are provided for the pivot-points 10.

A rim on the section 12 presses or fits over the lip 17 on the section 11 of the bowl.

A slot 18 between the rim 16 and section 11 is provided in which a knife or the like may be placed to pry the sections apart. A base 19 is fastened to the section 11.

Many advantages flow from the use to which I have put a bowl-ball. It may be used as a salad mixer plus the added feature of supplying a means for an outlet for excess materials and providing this outlet with a removable cup-base container for the saving of those materials which heretofore may have been wasted. The individual size bowls may be used as servers also and this eliminates the necessity for purchasing mixing as well as serving bowls. Another economical feature is the elimination of the serving-mixing spoon and fork now customarily in use. The small bowls may also be used as storage containers when not used for the mixing and serving of salads. All parts are simple and therefore easily handled. Every section may be cleansed and sterilized with little effort. The parts may be packed away, when not in use, in a minimum amount of space, and this applies to the stand also, since its stand-legs are detachable. A user of this type of mixing-serving bowl will save substantially in time, labor and materials.

I claim:

A device for the mixing of solid and liquid ingredients and the subsequent separate utilization of the mixed ingredients and the residue of unmixed liquid ingredients, said device comprising a pair of hollow hemispherical elements, each of said elements having a lip so dimensioned that said lips may be interfitted to form a fluid tight joint, said elements forming a hollow sphere, one of said elements being perforated in the region intersected by the axis of the sphere drawn perpendicular to the plane of said lips, a flange formed on the exterior of the perforated element and surrounding said axis and region, a cup fitting over and forming fluid tight seals with said flange, the cup having a substantially flat bottom, a base having a flat bottom on the other element, said cup and base having sockets intersected by said axis and a supporting means extending into said sockets and supporting said sphere for rotation about said axis.

MARGARET LEONA EASTON.

REFERENCES CITED

The following references are of record in the file of this patent:

UNITED STATES PATENTS

| Number | Name | Date |
|---|---|---|
| 7,273 | Price | Apr. 9, 1850 |
| 1,504,704 | Nordstrand | Aug. 12, 1924 |
| 1,765,129 | Cooke | June 17, 1930 |